US009288698B2

(12) United States Patent
Davydov et al.

(10) Patent No.: US 9,288,698 B2
(45) Date of Patent: Mar. 15, 2016

(54) HANDLING SIGNAL QUALITY MEASUREMENTS IN A WIRELESS COMMUNICATION NETWORK

(71) Applicant: Intel Corporation, Santa Clara, CA (US)

(72) Inventors: Alexei Vladimirovich Davydov, Nizhny Novgorod (RU); Gregory Vladimirovich Morozov, Nizhny Novgorod (RU); Alexander Alexandrovich Maltsev, Nizhny Novgorod (RU); Ilya Alexandrovich Bolotin, Nizhny Novgorod (RU); Vadim Sergeyevich Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 13/996,699

(22) PCT Filed: Nov. 2, 2012

(86) PCT No.: PCT/RU2012/000898
§ 371 (c)(1),
(2) Date: Jun. 21, 2013

(87) PCT Pub. No.: WO2014/070035
PCT Pub. Date: May 8, 2014

(65) Prior Publication Data
US 2015/0146545 A1    May 28, 2015

(51) Int. Cl.
*H04W 24/08*    (2009.01)
*H04W 52/26*    (2009.01)
(Continued)

(52) U.S. Cl.
CPC ............ *H04W 24/08* (2013.01); *H04W 52/241* (2013.01); *H04W 52/26* (2013.01); *H04W 52/325* (2013.01); *H04W 52/143* (2013.01)

(58) Field of Classification Search
CPC .......................... H04W 52/26; H04W 52/325
USPC ................. 370/252, 329, 256, 280, 328, 345; 455/522, 422.1, 452.1, 517, 67.13; 375/260, 267
See application file for complete search history.

(56) References Cited

U.S. PATENT DOCUMENTS 8,630,652 B2 *   1/2014   Monogioudis ................. 455/446
8,903,413 B2 *  12/2014   Ji et al. ......................... 455/453
(Continued)

OTHER PUBLICATIONS

International Search Report and Written Opinion mailed Aug. 8, 2013 from International Application No. PCT/RU2012/000898.

*Primary Examiner* — Parth Patel
(74) *Attorney, Agent, or Firm* — Schwabe, Williamson & Wyatt, P.C.

(57) ABSTRACT

Embodiments of the present disclosure describe techniques and configurations for handling signal quality measurements by a wireless device in a wireless network environment, particularly in a coordinated transmission environment. An apparatus may include computer-readable media having instructions and one or more processors coupled with the media and configured to execute the instructions to generate a power parameter corresponding to a power adjustment associated with a reference signal, provide the reference signal generated based in part on the generated power parameter to a wireless device, and provide the power parameter to transmission points operating in the coordinated transmission environment. Each of the transmission points may be configured to communicate the power parameter to the wireless device, and the wireless device may be configured to determine, based at least in part on the power parameter, a power characteristics associated with a channel in which the reference signal is provided.

19 Claims, 7 Drawing Sheets

(51) Int. Cl.
*H04W 52/32* (2009.01)
*H04W 52/24* (2009.01)
*H04W 52/14* (2009.01)

(56) References Cited

U.S. PATENT DOCUMENTS

| | | | |
|---|---|---|---|
| 8,938,247 B2* | 1/2015 | Gorokhov et al. | 455/452.1 |
| 2010/0254471 A1* | 10/2010 | Ko et al. | 375/260 |
| 2010/0331037 A1* | 12/2010 | Jen | 455/522 |
| 2011/0170435 A1* | 7/2011 | Kim et al. | 370/252 |
| 2012/0113859 A1* | 5/2012 | Jung et al. | 370/252 |
| 2012/0213109 A1* | 8/2012 | Xu et al. | 370/252 |
| 2012/0236741 A1* | 9/2012 | Xu et al. | 370/252 |
| 2012/0329503 A1* | 12/2012 | Jongren et al. | 455/509 |
| 2013/0003788 A1* | 1/2013 | Marinier et al. | 375/219 |
| 2013/0040675 A1* | 2/2013 | Ant et al. | 455/509 |
| 2013/0077513 A1* | 3/2013 | Ng et al. | 370/252 |
| 2013/0114430 A1* | 5/2013 | Koivisto et al. | 370/252 |
| 2013/0114434 A1* | 5/2013 | Muruganathan et al. | 370/252 |
| 2013/0130682 A1* | 5/2013 | Awad et al. | 455/434 |
| 2013/0195025 A1* | 8/2013 | Chatterjee et al. | 370/329 |
| 2013/0210435 A1* | 8/2013 | Dimou et al. | 455/436 |
| 2013/0242778 A1* | 9/2013 | Geirhofer et al. | 370/252 |
| 2013/0301432 A1* | 11/2013 | Hammarwall et al. | 370/252 |
| 2013/0303090 A1* | 11/2013 | Hammarwall et al. | 455/67.13 |
| 2013/0322376 A1* | 12/2013 | Marinier et al. | 370/329 |
| 2014/0022925 A1* | 1/2014 | Cili | 370/252 |
| 2014/0064247 A1* | 3/2014 | Teyeb et al. | 370/331 |
| 2014/0113677 A1* | 4/2014 | Parkvall et al. | 455/522 |
| 2014/0133425 A1* | 5/2014 | Kim et al. | 370/329 |
| 2014/0233665 A1* | 8/2014 | Clevorn et al. | 375/267 |
| 2014/0342768 A1* | 11/2014 | Soldati et al. | 455/522 |
| 2014/0369219 A1* | 12/2014 | Wang et al. | 370/252 |
| 2015/0018030 A1* | 1/2015 | Park et al. | 455/522 |
| 2015/0124736 A1* | 5/2015 | Ko et al. | 370/329 |
| 2015/0180628 A1* | 6/2015 | Kim et al. | 370/329 |

* cited by examiner

```
Resource-Management-Set-Config - r11 ::=                      600
SEQUENCE {
    csi - RS - r11              CHOICE {
        release                     NULL,
        setup                       SEQUENCE {
            antennaPortsCount - r10     ENUMERATED {an1, an2, an4, an8},
            resourceConfig - r10        INTEGER (0 .. 31),
            subframeConfig - r10        INTEGER (0 .. 154),
      604   scramblingSeedConfig - r11  INTEGER (0 .. 453),
            p-b-r11                     INTEGER (-8 .. 15)
        }
    }                                   OPTIONAL,    -- NEED ON csi - RS - r11              CHOICE {
        release                     NULL,
        setup                       SEQUENCE {
            antennaPortsCount - r10     ENUMERATED {an1, an2, an4, an 8},
            resourceConfig - r10        INTEGER (0 .. 31),
            subframeConfig - r10        INTEGER (0 .. 154),
      608   scramblingSeedConfig - r11  INTEGER (0 .. 453),
            p-b-r11                     INTEGER (-8 .. 15)
        }
    }                                   OPTIONAL,    -- NEED ON
}
```

CoMP resource management set configuration signaling

*Fig. 6*

HANDLING SIGNAL QUALITY MEASUREMENTS IN A WIRELESS COMMUNICATION NETWORK

CROSS REFERENCE TO RELATED APPLICATIONS

The present application is a national phase entry under 35 U.S.C. §371 of International Application No. PCT/RU2012/000898, filed Nov. 2, 2012, entitled "HANDLING SIGNAL QUALITY MEASUREMENTS IN A WIRELESS COMMUNICATION NETWORK". The entire content and disclosure of which is hereby incorporated by reference in its entirety.

FIELD

Embodiments of the present disclosure generally relate to the field of wireless communication systems, and more particularly, to techniques and configurations for handling signal quality measurements in wireless communication networks.

BACKGROUND

In wireless communication networks, signal quality (e.g., signal strength) measurements are used, for example, to provide a wireless device (also known as user equipment or UE) with essential information about strength of a cell of the network in which the UE operates. In a coordinated transmission environment, such as a Coordinated Multipoint Transmission (CoMP) environment operating in a $3^{rd}$ Generation Partnership Project (3GPP) Long Term Evolution (LTE) network, reference signal-based signal quality measurements may be used for determining the optimal transmission points for the UE, for example, in a CoMP set having one serving base station and multiple additional transmission points (e.g., picocells or remote radio heads (RRH)) assisting the base station. For example, channel state information reference signals (CSI-RS)-based signal quality measurements may be used to identify candidate coordinating signal transmission points. In order to improve accuracy of signal quality measurements, power boosting on CSI-RS may be employed. More specifically, some CSI-RS may be transmitted with artificially adjusted (e.g., increased or decreased) power levels in order for receiving UEs to perform accurate signal quality measurements.

Signal quality measurements may include a signal power-specific characteristic, such as Reference Signal Received Power (RSRP), which among other signal quality measurements may be reported to the higher layers in an LTE network and may be used for a variety of purposes including intra- and inter-frequency handover, inter-radio access technology handover, timing measurements, and other purposes in support of resource management (RRM) functions in LTE environment.

However, power boosting of reference signals used for signal quality measurements by UE may affect the accuracy of signal quality measurements. For example, the power level measured on power-boosted CSI-RS may be different than the actual received power from the transmission point. Accordingly, wrong assumptions may be made regarding actual signal quality of a particular transmission point or a base station when calculating a power signal-specific characteristic, such as RSRP. As a result, due to incorrect signal strength estimation, a particular base station or transmission point may be erroneously included in, or excluded from, a list of candidate transmission points for a particular UE.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of me accompanying drawings.

FIG. 6 illustrates an example data structure including a power parameter corresponding to a reference signal in a CoMP environment in accordance with some embodiments.

DETAILED DESCRIPTION

Figure 1:
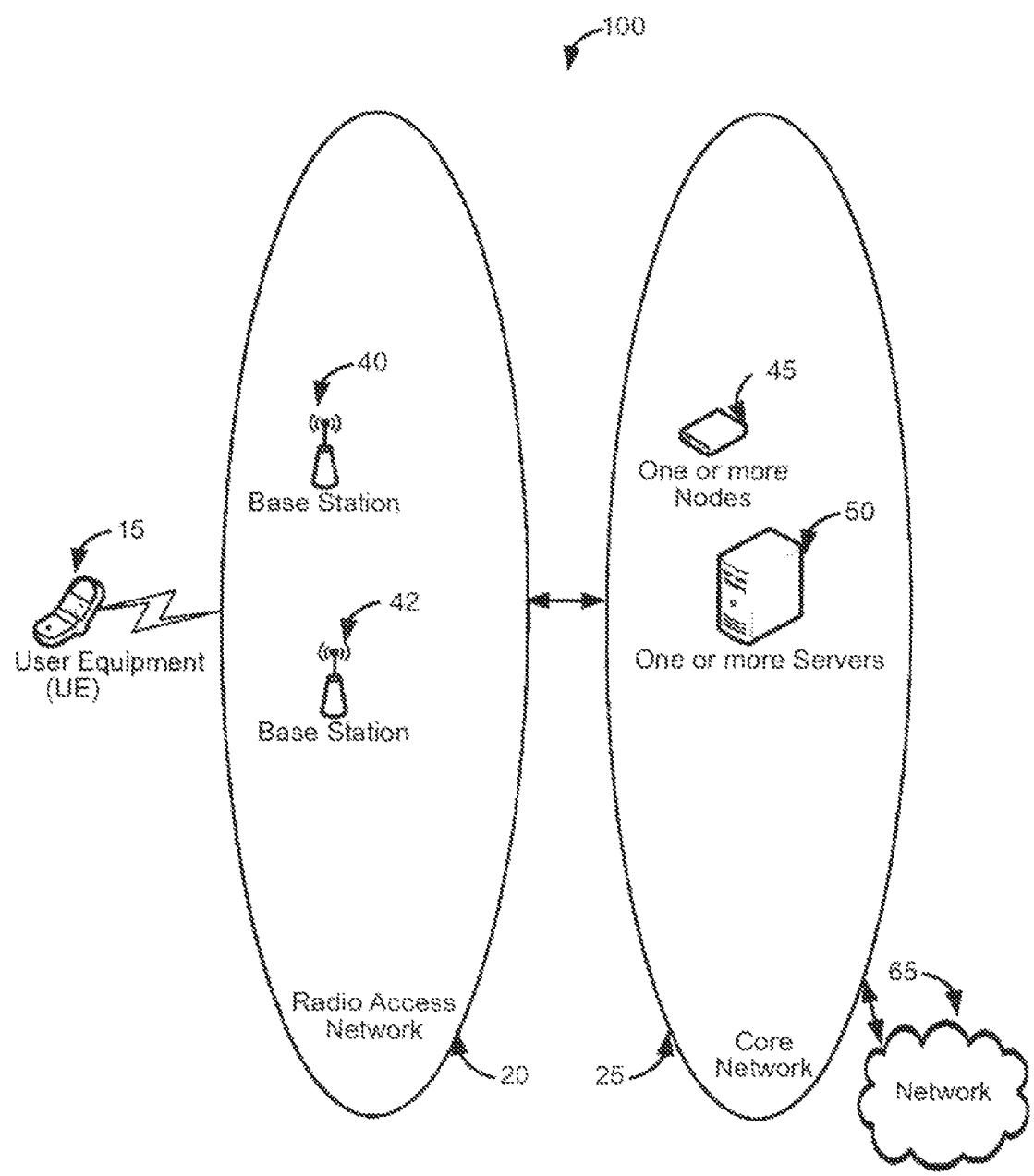
FIG. 1 illustrates an example wireless communication network in accordance with some embodiments.

Embodiments of the present disclosure provide data techniques and configurations in a wireless communication network including techniques and configurations for handling signal quality measurements by a UE in a wireless network environment. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks such as $3^{rd}$ Generation Partnership Project (3GPP) Long- Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes (eNBs), gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Techniques described herein provide for handling signal quality measurements by a UE in a wireless network environment, particularly in a CoMP environment, by informing the UE about the power adjustments that may have occurred on particular reference signals (e.g., CSI-RS) provided to the UE for signal quality measurements. In some embodiments, an additional signalling power parameter may be introduced in CSI-RS configuration of the CoMP resource configuration set (e.g., set of CSI-RS resources on which signal quality measurements are performed). The power parameter provided for a particular CSI-RS may correspond to a power adjustment required for the particular CSI-RS. The power parameter may be signaled, e.g., in a Radio Resource Control (RRC) protocol, to the UE in a coordination area and may be applied by the UE to the signal quality measurement, for example, when calculating a power signal-specific characteristic, such as RSRP.

FIG. 1 schematically illustrates an example wireless network 100 in accordance with some embodiments. The network 100 may include a RAN 20 and a core network 25. In some embodiments, the network 100 may be an LTE network, the RAN 20 may be a E-UTRAN, and the core network 25 may be an evolved core network such as EPS (Evolved Packet System). A UE 15 may access the core network 25 via a radio link with an eNB such as, for example, one of eNBs 40, 42, etc., in the RAN 20. The UE 15 may be, for example, a subscriber station (e.g., a mobile device) that is configured to communicate with the eNBs 40, 42 in conformance with one or more protocols. The following description is provided for an example network 100 that conforms with 3GPP for ease of discussion; however, subject matter of the present disclosure is not limited in this regard and the described embodiments may apply to other networks that benefit from the principles described herein. In some embodiments, the UE 15 may be configured to communicate using a multiple-input and multiple-output (MIMO) communication scheme. One or more antennas of the UE 15 may be used to concurrently utilize radio resources of multiple respective component carriers (e.g., which may correspond with antennas of eNBs 40, 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally deplete the UE 15 as a mobile wireless device (e.g., a cellular phone), in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In the present disclosure, the terms UE, wireless device, and mobile device will be used interchangeably for simplicity purposes. The eNBs 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45 (e.g., Radio Network Controllers). The one or more nodes 45 may act as an interface between the core network 25 and the RAN 20. According to various embodiments, the one or more nodes 45 may include a Mobile Management Entity (MME) that is configured to manage signaling exchanges between the base stations 40, 42 and the core network 25 (e.g., one or more servers 50), a Packet Data Network Gateway (PGW) to provide a gateway router to a wide network (e.g., Internet) 65, and/or a Serving Gateway (SGW) to manage user data tunnels or paths between the eNBs 40, 42 of the RAN 20 and the PGW. Other types, of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include one or more servers 50 that may be communicatively coupled to the base stations 40, 42. In an embodiment, the one or more servers 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the one or more servers 50 may be combined to reduce a number of servers, including, for example, being combined in a single machine or module.

According to various embodiments, the network 100 may be an Internet Protocol (IP) based network. For example, the core network 25 may be, at least in part, an IP based network, such as a packet switched (PS) network. Interfaces between network nodes (e.g., the one or more nodes 45) may be based on IP, including a backhaul connection to the base stations 40, 42. In some embodiments, a UE may communicate with the network according to one or more communication protocols, such as, for example, Radio Resource Control (RRC) protocol adapted, for LTE communication environment.

Figure 2:
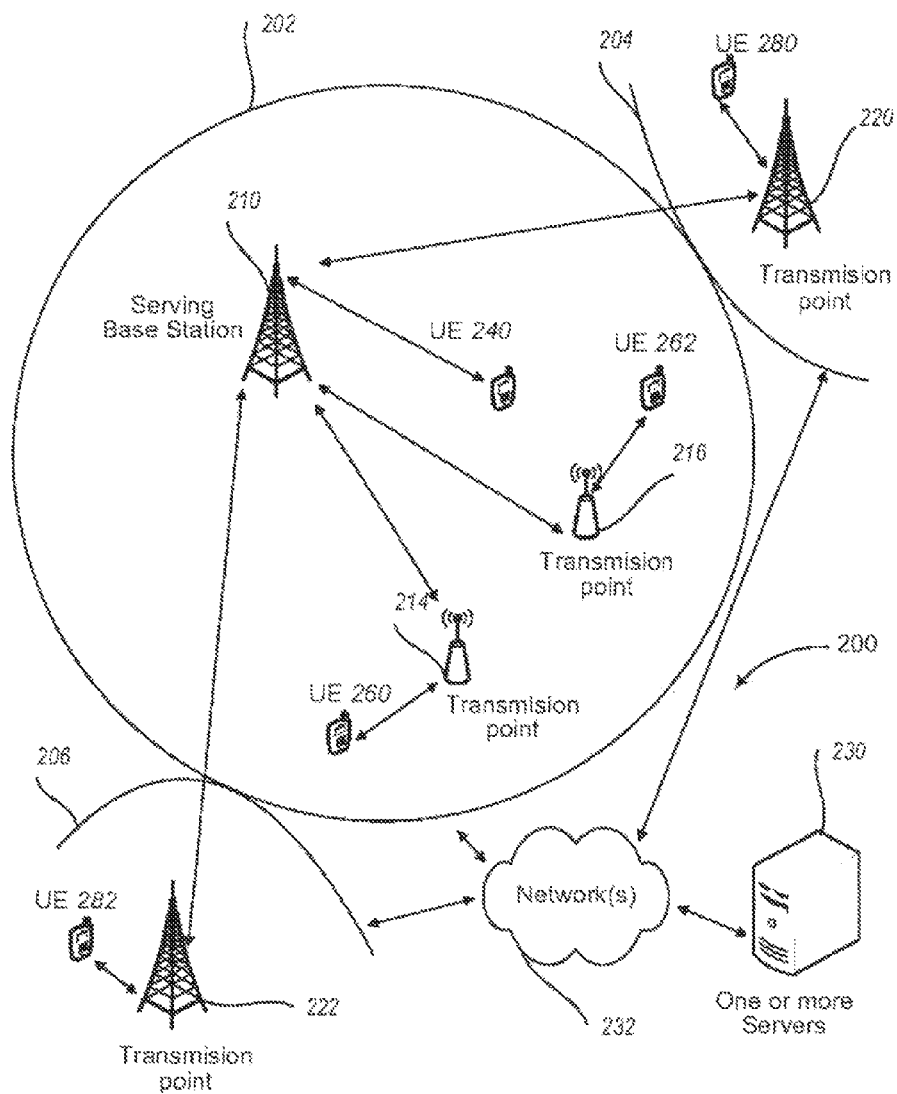
FIG. 2 illustrates an example environment in which some embodiments described herein may be practiced.

FIG. 2 illustrates an example environment 200 in which some embodiments described herein may be practiced. More specifically, FIG. 2 illustrates a coordinated transmission environment, such as a CoMP environment operating in the radio access network domain 20 of the network 100, such as LTE network. The environment 200 may include one or more coordination areas (e.g., cells or groups of cells) 202, 204, 206. For example, the coordination area 202 may include one or more cells (not shown) respectively served by one or more base stations (e.g., eNB) 210 and multiple transmission points 214, 216 (which may be different types of base stations, such as eNB, pico-eNB or RRH) configured to assist the base station (eNB) 210 serving one or more UEs (e.g., 240 and/or 260 and/or 262) located, for example, in the coordination area 202. For example, the transmission point 214 may be configured to communicate with (e.g., transmit reference signals to) UE 260 and assist the eNB 210 to serve UE 240. The environment 200 may further include other eNB (e.g., 220, 222) that may or may not be configured to assist eNB 210. The other eNB 220, 222 may be located in different coordination areas (e.g., 204, 206) and configured to serve UEs 280 and 282 respectively.

Coordinated Multipoint environment may provide for coordination between a number of geographically separated eNBs and/or transmission points. The eNBs and/or transmission, points may dynamically coordinate to provide joint scheduling and transmissions as well as proving joint processing of the received signals. For example, a UE may be able to be served by two or more eNBs to improve signals reception and/or transmission and increase throughput. Accordingly, in some embodiments, the CoMP environment may include a CoMP set comprising serving base station (e.g. eNB) 210 and one or more transmission points 214, 216 configured to assist the serving base station 210 in transmissions to one or more UEs 240. In some embodiments, the serving base station may include an eNB, RRH, pico-eNB and the like. In some embodiments, the CoMP environment may include eNBs 220 and 222 operating in different coordination areas 204 and 206. In some embodiments the transmission, points 214 and 216 may be configured to assist the serving base station (eNB) 210 in signal transmissions to the UE(s) 240. For example, coordination areas 204 and 206 may be neighboring coordination areas to the coordination area 202.

In a CoMP set operating in a coordination area 202, for example, in a set comprising the serving base station (eNB) 210 and transmission points 214, 216, the eNB 210 may share the same physical cell identification (Cell ID) with some of the transmission points 214, 216. For example, in a CoMP environment, the serving base station may be eNB 210, the transmission point 214 may be an RRH, and the transmission point 216 may be a picocell. In this configuration, the eNB 210 and the RRH 214 may have common physical cell identification (Cell ID). In the examples of base stations sharing a common Cell ID (e.g., 210 and 214), the conventional cell-specific reference signal (CRS)-based signal quality measurements (e.g., calculating RSRP) may not be used to identify candidate transmission points among the eNB 210 and transmission point 214 due to, for example, similarity of waveforms of the cell-specific reference signal transmissions.

In some embodiments, the CoMP environment 200 may be operated by a network server 230 implemented, for example, in the core network 25 and connected to the CoMP environment 200 via a network (e.g., internet) 232. The server 230 may be configured to make decisions regarding a power adjustment of the reference signals CSI-RS (e.g., for transmission points 210, 214, 216 and/or other serving base stations in other CoMP sets that are not shown in FIG. 2) and determine the power adjustment level of the reference signal if necessary. In some embodiments, the functions of determining the reference signal power adjustment may be distributed between the server 230 and a base station, such as transmission point 214 or other base stations transmitting reference signals. In some embodiments, the functions of the server 230 and one or more of the base stations of the CoMP set (e.g., 210, 214, 216, 220, 222 and/or other base stations not shown in FIG. 2) may be combined in the same apparatus.

Figure 3:
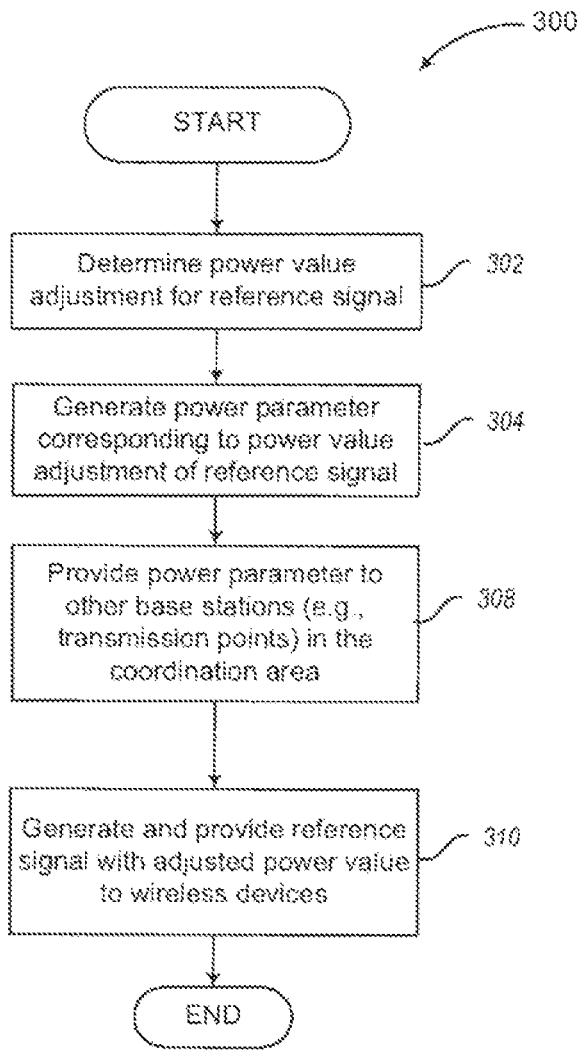
FIGS. 3-5 are process flow diagrams illustrating communications between a serving base station, transmission points, and user equipment in the Coordinated Multipoint Transmission (CoMP) environment in a wireless communication network in accordance with some embodiments.

FIG. 3 is a process flow diagram illustrating communications between a network server (e.g., 230) and transmission points (e.g., 210, 216, 220, and/or 222) in a CoMP environment in accordance with some embodiments. As discussed above, in some embodiments, the network server functions described herein may be distributed between the server and the transmission point 214. In some embodiments, a base station (e.g., transmission point 214) may assume the functions of the network server 230, specifically, in regard to determining whether power adjustment of a reference signal is needed and if so, determining a level of power adjustment.

The process 300 begins at block 302, where the network server (and/or a base station such as transmission point 214) may determine a power adjustment value for a reference signal transmitted to a UE (such as 260 and/or 262 respectively). For example, the power adjustment level of the CSI-RS transmitted by the transmission point 214 may depend at least in part on the mode of CSI-RS transmission (e.g., code division multiplexed vs. frequency division multiplexed). In another example, the server 230 (and/or transmission point 214) may determine that the reference signals (e.g., CSI-RS) received by some UEs (e.g., 260 and/or 240) may not contain enough energy to produce adequate signal quality measurements. This determination may be made, for example, based at least in part on channel quality indication (CQI) reports received by the server (and/or one or more serving base stations) from particular UEs.

For example, if the CQI reported by a particular UE is determined to be below a predetermined threshold, the CSI-RS for that UE may need to be adjusted (e.g., boosted) by a certain value, e.g., X dB. In another example, if the CQI reported by a particular UE is determined to be above another predetermined threshold, the CSI-RS for that UE may need to be adjusted (e.g., de-boosted) by a certain value, e.g., Y dB. In yet another example, the CQI reported by a particular UE may remain within a predetermined threshold range and no power adjustment may be required.

At block 304, a power parameter may be generated that may correspond to a power value adjustment of the reference signal determined at block 302. For example, the power parameter may be determined within a range of a first predetermined value (e.g., −8 dB) to a second predetermined value (e.g., +15 dB). The power parameter may be a scaling parameter that may be used for calculating power characteristics of a transmission channel, such as RSRP.

At block 308, the generated power parameter may be provided to other base stations (e.g., eNB 210 and/or 216) in the coordination area (e.g., 202). In some embodiments the power parameter may be also provided to transmission points that are outside of the coordination area 202 (e.g. eNBs 220, 222). In some embodiments, the power parameter may be signaled within a framework of a Communication protocol, e.g., in a RRC protocol, to the transmission points in a coordination area and/or outside a coordination area.

At block 310, the base station (e.g., transmission point 214) may generate and provide a reference signal (e.g., CSI-RS) with adjusted power value as determined at block 302. As described above, in some embodiments, the server 230 may configure the reference signal according to the required adjustment. The reference signal may be provided (e.g., transmitted), to the UEs (e.g., 260) in the coordination area. The provided, reference signal may be received by other UEs in the coordination area, such as the UE 240 that is configured to communicate with eNB 210. In some embodiments, the UE 240 may be configured to perform signal quality measurements associated with the reference signal that may transmitted, to other UEs, such as UE 260 as described above.

In some embodiments, base stations associated with different coordination areas (e.g., eNBs 220 and 222 associated with respective coordination areas 204 and 206) that may not cooperate with eNB 210 to serve UE 240, may transmit their own reference signals to the UEs that they serve (e.g., 280 and 282). Accordingly, if eNBs 220 and 222 determine the desired power adjustments associated with their respective reference signals, the eNBs 220 and 222 may inform the eNB 210 in the neighboring coordination area 202 of their respective power parameters. The eNB 210 may then inform the UE or UEs that it serves (e.g., UE 240) of the power adjustments and provide power parameters to the served UEs as described below in reference to FIG. 4.

Figure 4:
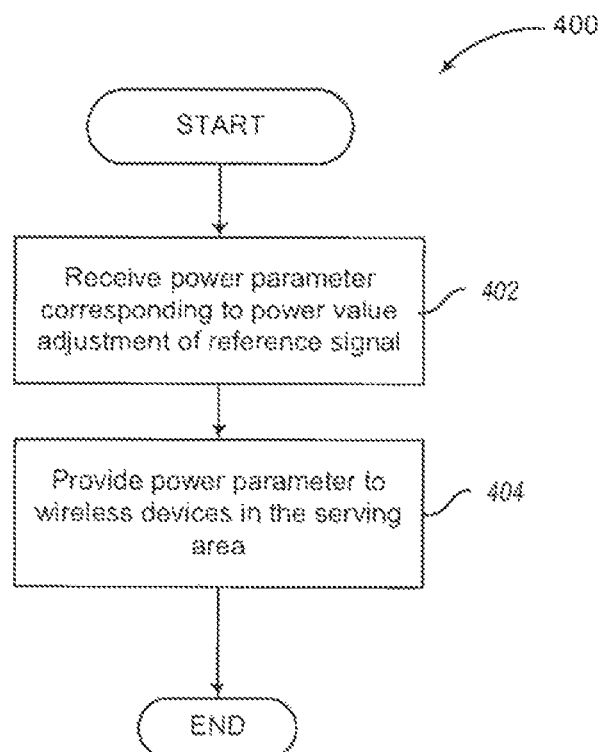

FIG. 4 is a process flow diagram illustrating communications between base stations (e.g., eNB 210 serving the UE 240) and one or more UEs (e.g., 240) in a CoMP environment in accordance with some embodiments. The process 400 begins at block 402, where a base station (e.g., eNB 210) may receive a power parameter corresponding to power value adjustments of the reference signal (e.g., CSI-RS) transmitted by one of transmission points 214, 216, 220, 222 as described in reference to FIG. 3.

At block 404, the eNB 210 may provide the received power parameter to the UEs in the coverage area of the eNB 210 (e.g., UE 240). In some embodiments, the power parameter may be provided in a data structure corresponding to a particular reference signal (CSI-RS) configuration, and described below in reference to FIG. 6. For example, the power parameter may be included in a data structure corresponding to a particular CSI-RS and transmitted to the UEs. In one example, the base station 210 serving UE 240 may decide whether or not to include the power parameter in the data structure to be provided to the UEs. In another example, the transmission point may be configured to provide the power parameter with the data structure by default.

Figure 5:
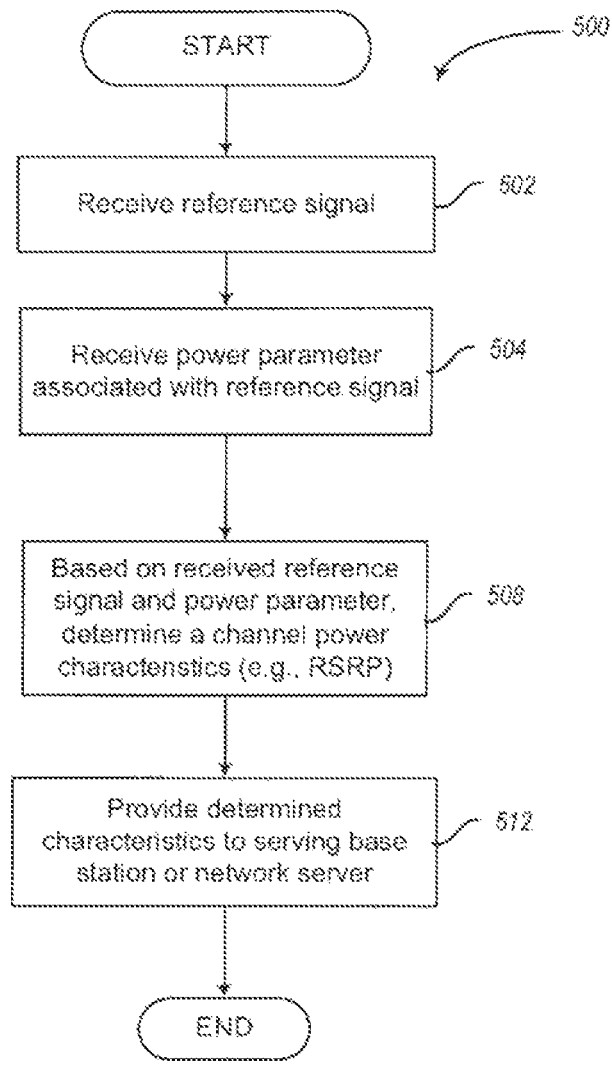

FIG. 5 is a process flow diagram illustrating operations of one or more UEs (e.g., 240) in a CoMP environment in accordance with some embodiments. The process 500 begins at block 502, where a UE may receive a reference signal (e.g., CSI-RS) from a base station (e.g., transmission point 214 in the coordination area 202 or 220 in the coordination area 204) as described above in reference to FIG. 3. At block 504, the UE may receive, e.g., from the serving base station (eNB) 210, a power parameter associated with the reference signal power value adjustment (e.g., with the data structure corresponding to a particular CSI-RS configuration). In general, the UE may receive the power parameter from a serving base station in the CoMP set operating in the coordination area as discussed above in reference to FIG. 4.

At block 508, the UE may determine, based at least in part on the received CSI-RS and the power parameter, a signal power characteristic, such as RSRP. For example, the power parameter may be applied by the UE to the signal quality measurement in the estimated channel as follows:

$$RSRF = f(P\_b * \hat{h}(i)),$$

where $\hat{h}(i)$ may be estimated on resource element i channel using antenna port of CSI-RS;

P_b may be a proposed scaling parameter; and $f$ may be RSRP calculation function.

In some embodiments the sealing parameter P_b may be a divider in the equation above. The value of P_b may convey information on the CSI-RS power adjustment and may range in the interval from −8 dB up to 15 dB, as discussed above.

At block 512, the UE may provide the calculated channel power characteristics (e.g., RSRP) to a serving base station (and/or network server). RSRP is one of physical layer measurements of the radio characteristics of a transmission.

FIG. 6 illustrates an example data structure 600 including a power parameter corresponding to a reference signal in a CoMP environment in accordance with some embodiments. More specifically, the data structure 600 may illustrate an example of RRC signaling of CSI-RS power adjustment in case of CoMP resource management set of size 2. In the data structure 600, the power parameter P_b may be named p-b-r11, as indicated by numerals 604 and 608. The indicator r11 may reflect a particular release number (e.g., Release 11 or other release numbers) of the 3GPP LTE specification.

Other parameters in the data structure 600 may correspond to different elements of the CSI-RS configuration according to a particular 3GPP specification (e.g., TS 36.211). For example, antennaPortsCount-r10 may be the number of antenna ports used for transmission of the CSI-RS. In code division multiplexing transmission mode this number may affect the power level setting for the CSI-RS. ResourceConfig-r10 may be the index of CSI-RS signal configuration. SubframeConfig-r10 may be a parameter/csi-rs of the CSI-RS subframe configuration. ScramblingSeedConfig-r11 may be the parameter $n_{ID}$ to control the initialization of the scrambler that generates the bit sequence to produce the CSI-RS signals. Other parameters corresponding to the particular CSI-RS configuration may be included in the data structure 600 as specified in the 3GPP specifications.

Figure 7:
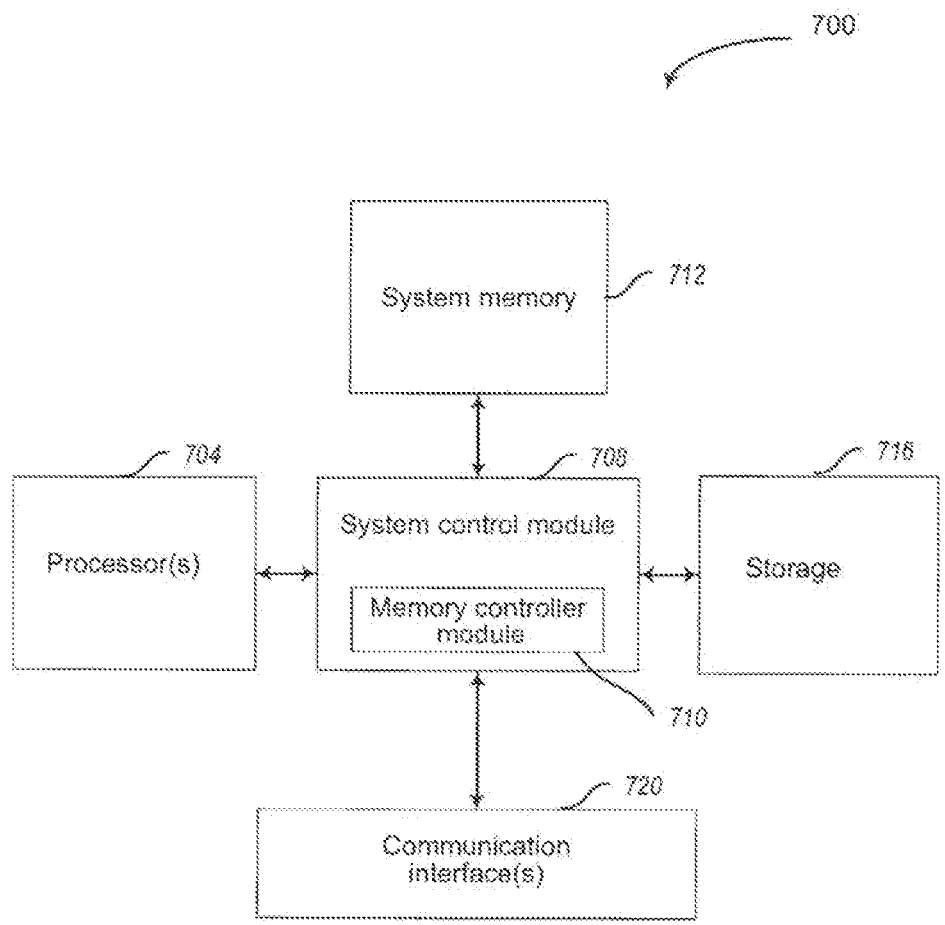
FIG. 7 illustrates an example system that may be used to practice various embodiments described herein.

Embodiments of the present disclosure may be implemented into a system using any suitable hardware and/or software to configure as desired. FIG. 7 schematically illustrates an example system that may be used to practice various embodiments described herein. FIG. 7 illustrates, for one embodiment, an example system 700 having one or more processor(s) 704, system control module 708 coupled to at least one of the processor(s) 704, system memory 712 coupled to system control module 708, non-volatile memory (NVM)/storage 710 coupled to system control module 708, and one or more communications interface(s) 720 coupled to system control module 708.

In some embodiments, the system 700 may be capable of functioning as the UE 15 or 240 as described herein in references to FIGS. 1 and 2. Further, the system 700 may be configured to perform the process 500 described above in reference to FIG. 5. In other embodiments, the system 700 may be capable of functioning as the one or more nodes 45 or one or more servers 50 of FIG. 1 or servers 230 of FIG. 2, or otherwise provide logic/module that performs functions as described for eNB 40, 42, 210, transmission points 214, 216, 220, and 222, and/or other modules described herein. Further, the system 700 may be configured to perform the processes 300 and/or 400 described above in reference to FIG. 3 and FIG. 4 respectively. In some embodiments, the system 700 may include one or more computer-readable media (e.g., system memory or NVM/storage 716) having instructions and one or more processors (e.g., processors 704) coupled with the one or move computer-readable media and configured to execute the instructions to implement a module to perform actions described herein.

System control module 708 for one embodiment may include any suitable interface controllers to provide for any suitable interface to at least one of the processor(s) 704 and/or to any suitable device or component in communication with system control module 708.

System control module 708 may include memory controller module 710 to provide an interface to system memory 712. The memory controller module 710 may be a hardware module, a software module, and/or a firmware module.

System memory 712 may be used to load and store data and/or instructions, for example, for system 700. System memory 712 for one embodiment, may include any suitable volatile memory, such as suitable DRAM, for example. In some embodiments, the system memory 712 may include double data rate type four synchronous dynamic random-access memory (DDR4 SDRAM).

System control module 708 for one embodiment may include one or more input/output (I/O) controller(s) to provide an interface to NVM/storage 716 and communication interface(s) 720.

The NVM/storage 716 may be used to store data and/or instructions, for example. NVM/storage 716 may include any suitable non-volatile memory, such, as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 716 may include a storage resource physically part of a device on which the system 700 is installed or it may be accessible by, but not necessarily a part of, the device. For example, the NVM/storage 716 may be accessed over a network via the communications interface(s) 720.

Communications interface(s) 720 may provide an interface for system 700 to communicate over one or more network(s) and/or with any other suitable device. The system 700 may wirelessly communicate with the one or more components of the wireless network is accordance with any of one or more wireless network standards and/or protocols.

For one embodiment, at least one of the processor(s) 704 may be packaged together with logic for one or more controller(s) of system control module 708, e.g., memory controller module 710. For one embodiment, at least one of the processor(s) 704 may be packaged together with logic for one or more controllers of system control module 708 to form a System in Package (SiP). For one embodiment, at least one of the processor(s) 704 may be integrated on the same die with logic for one or more controller(s) of system control module 708. For one embodiment, at least one of the processor(s) 704 may be integrated on the same die with logic for one or more controller(s) of system control module 708 to form a System on Chip (SoC).

In various embodiments, the system 700 may be, but is not limited to, a server, a workstation, a desktop computing device, or a mobile computing device (e.g., a laptop computing device, a handheld computing device, a tablet, a netbook, etc.). In various embodiments, the system 700 may have more or less components, and/or different architectures. For example, in some embodiments, the system 700 may include one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

The invention claimed is:

1. An apparatus comprising:
one or more non-transitory computer-readable media comprising instructions; and
one or more processors coupled with the one or more non-transitory computer-readable media and configured to execute the instructions to:
generate a power parameter corresponding to a power value adjustment associated with a reference signal to be provided to one wireless device operating on a wireless communication network;
provide the reference signal generated based at least in part on the generated power parameter to the at least one wireless device; and
provide the generated power parameter to one or more transmission points in a data structure including a plurality of parameters associated with the reference signal, wherein the plurality of parameters includes antenna ports count parameter, resource configuration parameter, and subframe configuration parameter,
wherein at least one of the one or more transmission points is configured to communicate the power parameter to the at least one wireless device, and wherein the at least one wireless device is configured to determine, based at least in part on the power parameter, a power characteristics associated with a channel in which the reference signal is provided, wherein the power characteristics is a Reference Signal Received Power (RSRP), and wherein the power parameter is a scaling parameter applied to calculate RSRP using an RSRP calculation function, wherein to determine the power characteristics includes to multiply a parameter estimated on the channel using an antenna port of a channel state information signal (CSI-RS), by the scaling parameter, wherein the scaling parameter is to range from −8 dB to 15 dB, wherein the reference signal is the CSI-RS.

2. The apparatus of claim 1, wherein the one or more processors are further configured to execute the instructions to determine the power value adjustment that enables the at least one wireless device to calculate the power characteristics, the power value adjustment including one of boosting or de-boosting a power level of the reference signal, or leaving the power level of the reference signal unchanged.

3. The apparatus of claim 2, wherein the one or more processors are further configured to execute the instructions to determine the power value adjustment based at least in part on a channel quality indication (CQI) report received from the at least one wireless device.

4. The apparatus of claim 1, wherein the power parameter is provided via a Radio Resource Control (RRC) protocol.

5. The apparatus of claim 1, wherein the channel in which the reference signal is provided includes a downlink transmission channel.

6. The apparatus of claim 1, wherein the apparatus comprises one of a subset of transmission points in a Coordinated Multipoint Transmission (CoMP) set.

7. The apparatus of claim 1, wherein the wireless communication network includes a $3^{rd}$ Generation Partnership Project (3GPP) Long Term Evolution (LTE) network.

8. The apparatus of claim 1, wherein the apparatus comprises a server associated with a wireless communication network and operating in a Coordinated Multipoint Transmission (CoMP) set.

9. The apparatus of claim 1, wherein the one or more processors are further configured to execute the instructions to transmit the reference signal to other wireless devices, wherein the at least one wireless device is configured to receive the reference signal.

10. An apparatus comprising:
one or more non-transitory computer-readable media comprising instructions; and
one or more processors coupled with the one or more non-transitory computer-readable media and configured to execute the instructions to:
receive a power parameter associated with a channel state information reference signal (CSI-RS) to be provided to at least one wireless device operating on a wireless communication network; and
communicate the power parameter in a data structure including a plurality of parameters corresponding to the CSI-RS to the at least one wireless device, wherein the at least one wireless device is configured to determine, based at least in part on the power parameter and the CSI-RS, a power characteristics associated with a channel in which the CSI-RS is provided, wherein the plurality of parameters includes antenna ports count parameter, resource configuration parameter, and subframe configuration parameter, wherein the power characteristics is a Reference Signal Received Power (RSRP), and wherein the power parameter is a scaling parameter applied to calculate RSRP using an RSRP calculation function, wherein to calculate RSRP includes to multiply a parameter estimated on the channel using an antenna port of the CSI-RS, by the scaling parameter, wherein the scaling parameter is to range from −8 dB to 15 dB, wherein the scaling parameter is to range from −8 dB to 15 dB.

11. The apparatus of claim 10, wherein the apparatus comprises one of a plurality of transmission points in a Coordinated Multipoint Transmission (CoMP) set.

12. An apparatus comprising:
one or more non-transitory computer-readable media comprising instructions; and
one or more processors coupled with the one or more non-transitory computer-readable media and configured to execute the instructions to:
receive a channel state information reference signal (CSI-RS);
receive a power parameter associated with the CSI-RS in a data structure including a plurality of parameters associated with the CSI-RS, wherein the plurality of parameters includes antenna ports count parameter, resource configuration parameter, and subframe configuration parameter, and the power parameter indicating a power value adjustment associated with the received CSI-RS; and
determine, based at least in part on the power parameter and the CSI-RS, a power characteristics associated with a channel in which the CSI-RS is provided, wherein the power characteristics is a Reference Signal Received Power (RSRP), and wherein the power parameter is a scaling parameter applied to calculate RSRP using an RSRP calculation function, wherein to determine the power characteristics includes to multiply a parameter estimated on the channel using an antenna port of the CSI-RS, by the scaling parameter, wherein the scaling parameter is to range from −8 dB to 15 dB.

13. The apparatus of claim 12, wherein the apparatus comprises a wireless device operating on a wireless communication network.

14. The apparatus of claim 12, wherein the one or more processors that are configured to receive the CSI-RS are further configured to receive the CSI-RS from one of a plurality of transmission points in a Coordinated Multipoint Transmission (CoMP) set.

15. The apparatus of claim 12, wherein the one or more processors that are configured to receive the power parameter associated with the CSI-RS are further configured to execute the instructions to receive the plurality of parameters associated with the CSI-RS, wherein the plurality of parameters is provided via a Radio Resource Control (RRC) protocol.

16. At least one non-transitory computing device-readable storage medium comprising instructions stored thereon wherein the instructions, in response to execution on a computing device, cause the computing device to:
generate a power parameter corresponding to a power value adjustment associated with a reference signal to be provided to at least one wireless device operating on a wireless communication network;
provide the reference signal generated based at least in part on the generated power parameter to the at least one wireless device; and
provide the generated power parameter to one or more transmission points,
wherein at least one of the one or more transmission points is configured to communicate the power parameter to the at least one wireless device in a data structure including a plurality of parameters associated with the reference signal, wherein the at least one wireless device is configured to determine, based at least in part on the power parameter, a power characteristics associated with a channel in which the reference signal is provided, wherein the plurality of parameters includes antenna ports count parameter, resource configuration parameter, and subframe configuration parameter, wherein the power characteristics is a Reference Signal Received Power (RSRP), and wherein the power parameter is a scaling parameter applied to calculate RSRP using an RSRP calculation function, wherein to determine the power characteristics includes to multiply a parameter estimated on the channel using an antenna port of a channel state information signal (CSI-RS), by the scaling parameter, wherein the scaling parameter is to range from −8 dB to 15 dB, wherein the reference signal is the CSI-RS.

17. The non-transitory computing device-readable storage medium of claim 16, wherein at least a subset of the one or more transmission points includes a common physical cell identifier.

18. The non-transitory computing device-readable storage medium of claim 16, wherein the instructions further cause the computing device to determine, based at least in part on the power parameter, a power characteristics associated with a channel in which the reference signal is provided.

19. The non-transitory computing device-readable storage medium of claim 16, wherein the instructions further cause the computing device to determine a power value adjustment that enables the at least one wireless device to calculate the power characteristics, the power value adjustment including one of boosting or de-boosting a power level of the CSI-RS or keeping the power level of the CSI-RS unchanged.

* * * * *